United States Patent Office 3,563,919
Patented Feb. 16, 1971

3,563,919
COPOLYMERS OF ADAMANTANE
AND BENZENE
Abraham Schneider, Overbrook Hills, Pa., assignor to Sun Oil Company, Philadelphia, Pa., a corporation of New Jersey
No Drawing. Filed Mar. 25, 1969, Ser. No. 810,340
Int. Cl. C08g 33/00
U.S. Cl. 260—2
15 Claims

ABSTRACT OF THE DISCLOSURE

Novel film forming hydrocarbon copolymers having the repeating unit

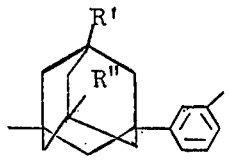

where R' and R" are hydrocarbon radicals having 1–20 carbons, for example, methyl, are prepared by reacting 1,3-dimethyladamantane with a di (tertiary hydrocarbyl) benzene such as para-di-(t-butyl) benzene in the presence of $AlCl_3$ catalyst at around 0 to 25° C.

---

The present invention relates to novel hydrocarbon copolymers of adamantanes and benzene and a method for preparing said copolymers.

Adamantane (tricyclo[3.3.1.1$^{3,7}$]decane) has a carbon structure containing ten carbon atoms arranged in a completely symmetrical, strainless manner and is often described as a cage-like structure which consists of three condensed cyclohexane rings. There are four bridgehead carbon atoms which are equivalent to each other as are the rings. The adamantane structure is often depicted by:

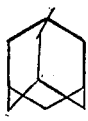

Numerous polymers containing adamantane have been developed. Principally these polymers involve linkages through such functionalities as ester, acid, anhydride, amine, amide, urethane and the like. The present invention now provides a completely hydrocarbon polymer containing adamantane moieties and benzene moieties. Briefly stated, the present invention is a hydrocarbon copolymer comprising the repeating structural unit

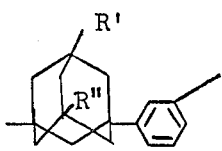

where R' and R" are radicals having 1–20 carbon atoms independently selected from the group consisting of alkyl and cycloalkyl. The copolymers of the present invention can be formed into films or coatings by heat extrusion or from a solvent such as chloroform to provide films and coatings with high glass transitions having a high degree of stability to both thermal and oxidative degradation.

The copolymers of the invention can be prepared by reacting an adamantane of the structure

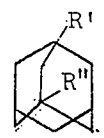

with ditertiary hydrocarbyl benzene of the structure

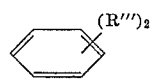

where R' and R" are as previously defined and R''' is a radical selected from the group consisting of (1) tertiary-alkyl having 4 to 8 carbon atoms and (2) tertiary-cyclo-alkyl having 7 to 10 carbon atoms, in the presence of a Lewis acid catalyst such as $AlCl_3$, $AlBr_3$, HF, HF—$BF_3$, $BF_3$ or mixtures thereof. The reaction is carried out in a suitable inert solvent which will preferably retain the reactants and copolymer product in solution. Suitable solvents include the inert bromo-, chloro- and fluoroalkanes of, for example, 1 to 5 carbon atoms such as methylene chloride, tetrachloroethane, trifluoroethane, perfluoroethane and the like. The reaction is carried out at relatively low temperatures, i.e., —10 to 40° C. The reaction produces higher molecular weight copolymers where the adamantane and benzene reactants are present in a mole ratio of essentially 1:1.

The adamantane hydrocarbons are well known and their preparation is adequately described in the literature. Although the number of carbon radicals in each substituent R' and R" radical can range up to 20, it is generally preferred that each R' and R" contain no more than 10 carbon atoms and most preferred are methyl and ethyl groups. Some suitable adamantane hydrocarbons are 1,3-dimethyladamantane; 1-methyl-3 - ethyladamantane; 1,3-diethyladamantane; 1,3-di-n-pentyladamantane; 1-methyl-3-heptyladamantane; 1-n-decyl - 3 - ethyladamantane; 1-methyl-3-isopropyladamantane; and 1-methyl-3-cyclohexyladamantane.

The di(tertiary hydrocarbyl)benzene can have either tertiary alkyl or tertiary cycloalkyl groups attached at ortho, meta or para positions. Regardless of the location of the tertiary hydrocarbyl groups on the benzene moiety the copolymer linkage will be at meta positions. For example, suitable ditertiary hydrocarbyl benzenes would be benzene disubstituted at the ortho, meta or para positions by such tertiary radicals as tertiary butyl; 1,1-dimethylpropyl; 1,1,4-trimethylpentyl; norbornyl; 1,3-dimethylcyclohexyl and the like. It is important that the di(tertiary hydrocarbyl)benzene reactant be as free from mono tertiary hydrocarbyl substituted benzenes as possible since the mono substituted benzenes can inhibit the polymerization reaction by capping the polymer chains with nonreactive benzene.

Some suitable ditertiary hydrocarbyl benzenes are p-di-(t-butyl) benzene; m-di-(t-butyl) benzene; o-di-(1,1,4-trimethylpentyl) benzene; p-di-(norbornyl) benzene; m-di-(1,3-dimethylcyclohexyl) benzene and the like.

In the present process and the copolymers produced therefrom, the terminal portion can have a number of configurations such as an adamantane moiety equivalent to the adamantane reactant, an unsubstituted benzene or a benzene having one or two tertiary hydrocarbyl substituents. More than likely, any polymerization will yield a mixture of terminal groups. Insofar as the present copolymers are concerned, the configuration of the terminal groups is not significant since in any event the entire copolymer is composed of hydrocarbons. As to the utilities set forth hereinabove, the variation in terminal groups produces no distinguishable variation in the copolymers.

In the following examples, inherent viscosities ($\eta_{inh}$) were obtained at a concentration of 0.5 g./dl at 100° F. in the indicated solvent. Number average molecular weight were determined by vapor pressure osometry. The glass transition temperatures were determined on a Perkin-Elmer Differential Scanning Calorimeter Model DSC–1B. The polymer configuration was determined by nuclear magnetic resonance and X-ray scan.

The following examples are presented to illustrate the invention.

EXAMPLE 1

The following were charged to magnetically stirred, 3-necked Morton flask equipped with condenser, drying tube and thermometer:

1.9436 g. p-di-(t-butyl)benzene ($1.02 \times 10^{-2}$ moles)
1.6749 g. 1,3-dimethyladamantane ($1.02 \times 10^{-2}$ moles)
5 cc. methylene chloride The reactants dissolved easily. The solution was blanketed with nitrogen and cooled to 0° C. in an ice bath.

The catalyst was prepared by adding 0.393 g. of AlCl$_3$ to 6 cc. of methylene chloride (all of the AlCl$_3$ did not dissolve). From this suspension, 2 cc. were withdrawn and added to the reaction vessel (app. 0.10–0.13 g. of AlCl$_3$).

3 cc. of methylene chloride were added to the reaction vessel to bring total solvent volume to 10 cc. and the system again blanketed with nitrogen. A slow stream of nitrogen was kept flowing over the solution during the reaction.

The clear yellow reaction solution was stirred at −3 to −4° C. for 30 minutes and then allowed to warm (15 minutes) to room temperature (∼25° C.). The solution became darker in color turning to bright orange and isobutane was evolved. The solution was stirred at room temperature for an additional hour. At the end of this time (1¾ hours total), the solution had become a thick orange gel. Treatment of the gel with 50 cc. of methanol yielded a fine white powder which was filtered off and air dried. The yield of crude product was 2.83 g. The material was twice precipitated from chloroform, filtered and vacuum oven dried at 50° C. to yield 1.39 of fine white polymer (57% yield of theoretical). Some properties are set out in the table following Example 2.

EXAMPLE 2

A solution consisting of:

1.17 g. of p-di(t-butyl) benzene [$0.616 \times 10^{-2}$ mole]
1.00 g. of DMA [$0.616 \times 10^{-2}$ mole]
5.00 ml. methylene chloride was stirred magnetically at 0° C. and 0.08 g. of AlCl$_3$ was added. The solution turned a bright yellow immediately. After six minutes at 0° C. with no further sign of reaction, the suspension of AlCl$_3$ in the reaction mixture was allowed to warm to room temperature (24° C.) while being stirred. Isobutane was evolved at room temperature and after 30 minutes at 24° F., the reaction was killed by the addition of 50 mls. of methanol. This caused the precipitation of a fine, colorless powder which was filtered and warmed to 70° C. to drive off solvent. Yield 1.20 g. of crude product (81.5% of theoretical). The properties of the crude product are given in the following table.

TABLE

| Example | 1 | 2 |
|---|---|---|
| Inherent viscosity ($\eta_{inh}$) | [1] 0.06 | [2] 0.03 |
| Molecular wt. $\bar{M}_n$ | 2,300 | 1,200–1,500 |
| Degree of polymerization | 9–10 | 5–6 |
| Glass transition temp., ° C | | 182 |
| Melting point, ° C | | 240–260 |
| X-ray analysis, A | | 13.5 |
| | | 7.9 |
| | | 6.4 |
| | | 4.6 |
| | | 2.7 |

[1] Chloroform.  [2] Benzene.

The invention claimed is:
1. A hydrocarbon copolymer consisting essentially of the repeating structural unit

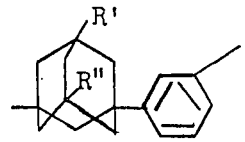

where R′ and R″ are radicals having 1–20 carbon atoms independently selected from the group consisting of alkyl and cycloalkyl.

2. The hydrocarbon copolymer according to claim 1 wherein R′ and R″ have 1–10 carbon atoms.

3. The hydrocarbon copolymer according to claim 1 wherein R′ and R″ are methyl or ethyl.

4. The hydrocarbon copolymer according to claim 3 wherein R′ and R″ are methyl.

5. A process for preparing a hydrocarbon copolymer having the repeating structural unit

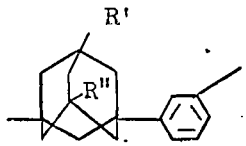

where R′ and R″ are radicals having 1–20 carbon atoms independently selected from the group consisting of alkyl and cycloalkyl comprising reacting an adamantane compound of the structure

with a di(tertiary aliphatic alkyl)benzene of the structure

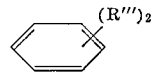

where R‴ is a radical selected from the group consisting of (1) tertiary-alkyl having 4 to 8 carbon atoms and (2) tertiary-cycloalkyl having 7 to 10 carbon atoms in the presence of a Lewis acid catalyst and in an inert solvent.

6. A process according to claim 5 wherein the temperature is in the range of −10 to 40° C.

7. A process according to claim 6 wherein the Lewis acid catalyst is selected from the group consisting of AlCl$_3$, AlBr$_3$, HF, HF—BF$_3$, BF$_3$ and mixtures thereof.

8. A process according to claim 7 wherein the inert solvent is a bromo-, chloro- or fluoro-substituted alkane having 1–5 carbon atoms.

9. A process according to claim 7 wherein the solvent is methylene chloride, tetrachloroethane, trifluoroethane, or perfluoroethane.

10. A process according to claim 5 wherein the mole ratio of adamantane compound to ditertiary substituted benzene is essentially 1:1.

11. A process according to claim 8 wherein the R' and R" have 1 to 10 carbon atoms.

12. A process according to claim 11 wherein the R' and R" are methyl or ethyl.

13. A process according to claim 12 wherein R' and R" are methyl.

14. A process according to claim 13 wherein the di(tertiary aliphatic alkyl)benzene is para-di(tertiary-butyl)benzene.

15. A process according to claim 9 wherein the solvent is methylene chloride.

References Cited

UNITED STATES PATENTS 3,342,880  9/1967  Reinhardt _____ 260—2

SAMUEL H. BLECH, Primary Examiner

U.S. Cl. X.R.

117—161; 260—33.8, 666